Aug. 16, 1966 M. SCHLICHTE 3,267,217
CIRCUIT ARRANGEMENT FOR THE CONNECTION OF TIME MULTIPLEX TELEPHONE SYSTEMS
Filed Nov. 13, 1962
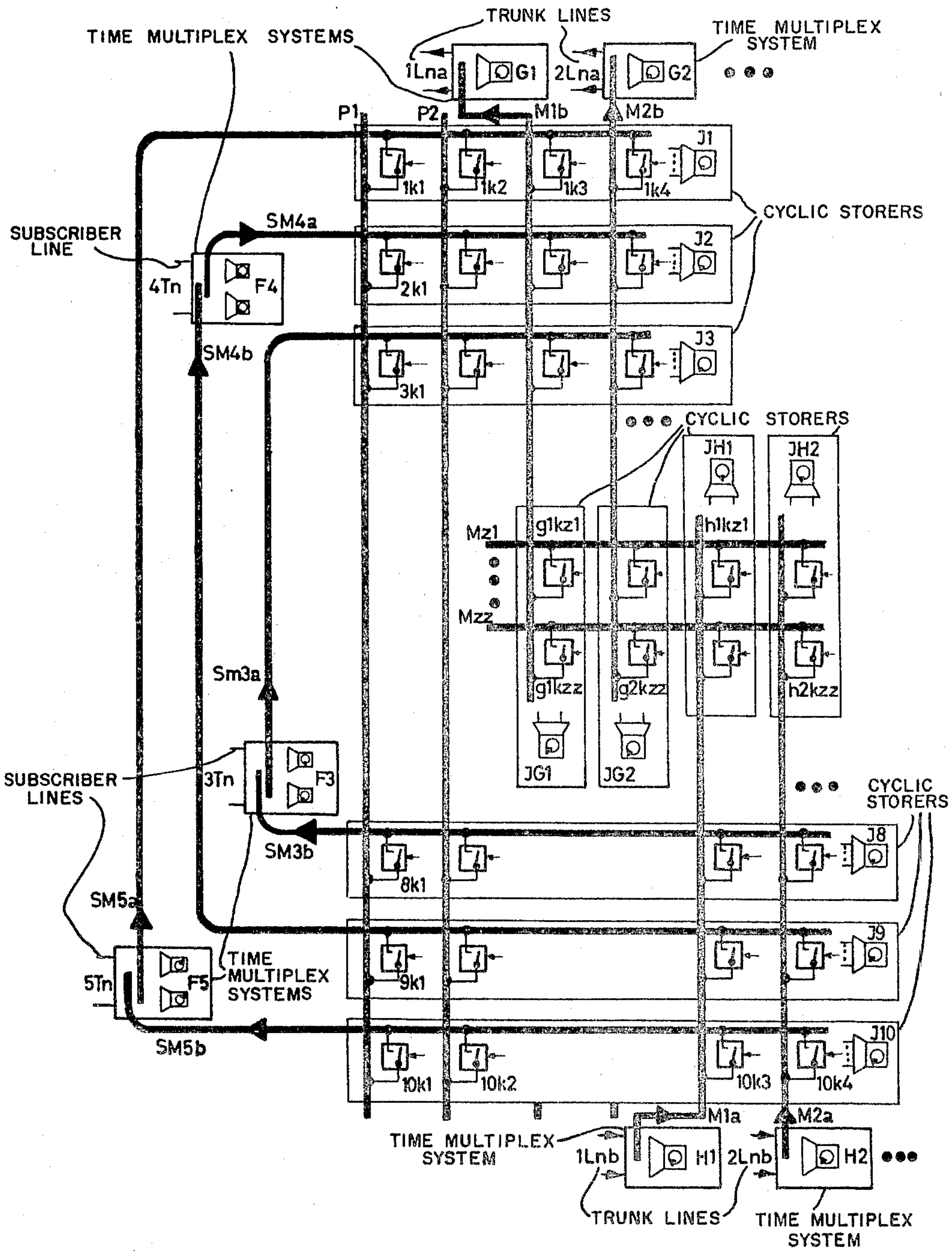

3,267,217

CIRCUIT ARRANGEMENT FOR THE CONNECTION OF TIME MULTIPLEX TELEPHONE SYSTEMS

Max Schlichte, Munich, Germany, assignor to Siemens & Halske Aktiengesellschaft, Berlin and Munich, Germany, a corporation of Germany Filed Nov. 13, 1962, Ser. No. 237,405
Claims priority, application Germany, Nov. 16, 1961, S 76,717
5 Claims. (Cl. 179—15)

The invention disclosed herein is concerned with a circuit arrangement for the connection of time multiplex telephone systems, and may be considered in the nature of an improvement on the circuit arrangement described in the copending application Serial No. 210,406, filed July 17, 1962, which is owned by the assignee named in the present case.

The copending application discloses a circuit arrangement over which is conducted the traffic (calls) of a plurality of time multiplex telephone systems having respectively a call (or speech) multiplex line over which are conducted the calls incoming to the subscribers thereof, and also having a call multiplex line over which are conducted the calls outgoing from the corresponding subscribers, the subscriber stations involved in calls being with the aid of call (or speech) switches periodically impulse-wise connected with the corresponding multiplex lines (connected in a particular time slot of a respective time sequence). The circuit arrangement is constructed as a coupling multiple, sometimes also referred to as a cross-wire multiple, to the row conductors of which are connected the individual call multiplex lines for the outgoing and incoming calls, respectively, thus making it possible to extend calls between the time multiplex systems over the column conductors by establishing connections between respective call multiplex lines for outgoing calls with corresponding call multiplex lines for incoming calls. This is done by impulse-wise closure of the coupling point contacts which are connected with the respective column conductors and row conductors. There are additionally provided further column conductors which cross respectively only row conductors with call multiplex lines for outgoing calls and which are connected with multiplex lines of time multiplex systems having, instead of subscriber stations, trunk lines extending to other exchanges, and still further column conductors which cross respectively only row conductors with call multiplex lines for incoming calls and which are connected with multiplex lines of time multiplex systems having, instead of subscriber stations, trunk lines coming from other exchanges, thus making it possible to extend over these further column conductors, by impulse-wise closure of coupling point contacts connected with the respective column conductors and row conductors, the calls outgoing to the other exchanges and incoming at such exchanges. The time multiplex systems provided with exhange lines, instead of with subscriber lines, can also be combined in pairs to form communication systems, each with a multiplex line for the outgoing calls and a multiplex line for the incoming calls, whereby exchange lines or trunks take the place of subscriber lines, such trunks serving to extend the outgoing as well as the incoming calls. The coupling multiple disclosed in the copending application is adapted to serve for the calls within and between the individual time multiplex systems of an exchange and likewise for the calls between subscribers of the respective individual systems of the corresponding exchange and other exchanges connected therewith over trunk lines. It is in this manner normally possible to extend all desired connections within and between different exchanges.

However, it may in some situations be desirable to have available further possibilities for extending calls, so that lines, which are connected to a particular time multiplex communication system of an exchange and lead to another exchange or the like, can be connected not only with subscribers of a system of the respective exchange, but also with other lines which lead to other exchanges or the like, which lines are likewise connected with a particular time multiplex communication system of the corresponding exchange. This may be the case, for example, when all regular connection paths, extending between two remote exchanges, are busy, while idle lines or trunks extending from both remote exchanges and leading to the coupling arrangement described in the copending application, are still available. The invention disclosed herein makes it possible to extend over such exchange, that is, over the coupling circuit arrangement thereof over which are extended the calls of the time multiplex communication systems of such exchange, a by-pass connection between the two remote exchanges.

The present invention is accordingly concerned with an improvement, applying to a circuit arrangement over which are extended calls of a plurality of time multiplex telephone communication systems having respectively a call multiplex line for incoming calls and a call multiplex line for outgoing calls, wherein the subscriber stations involved in calls are with the aid of call switches respectively periodically impulse-wise connected with said call multiplex lines, said circuit arrangement being, according to the copending application, constructed as a coupling multiple having row conductors to which are respectively connected the individual call multiplex lines for outgoing calls and the individual call multiplex lines for incoming calls, thus making it possible to extend over the column conductors connections within and between the corresponding time multiplex systems, by respectively connecting a call multiplex line for outgoing calls with a call multiplex line for incoming calls, such connections being established by impulse-wise closing of coupling point contacts connected with the coresponding column conductors and row conductors, and providing further particular column conductors which are disposed so as to respectively cross only row conductors with call multiplex lines for outgoing calls or only row conductors with call multiplex lines for incoming calls, and wherein trunks respectively extending to or coming from other exchanges are connected with the multiplex lines of time multiplex communication systems, instead of having subscriber lines connected therewith; said improvement comprising the provision, in said coupling multiple, of further row conductors which cross respectively only the particular column conductors to which are connected multiplex lines of time multiplex communication systems having instead of subscriber lines trunks connected thereto, which extend to other exchanges and the further particular column conductors to which are connected the multiplex lines of time multiplex communication systems having instead of subscriber stations trunks connected therewith which come from other exchanges, thus making it possible to extend over said further row conductors, by impulse-wise closure of coupling point contacts connected with the corresponding row conductors and column conductors, calls respectively between and within the time multiplex communication systems which are instead of with subscriber lines equipped with lines or trunks leading to other exchanges.

Further details of the invention will appear from the description which is rendered below with reference to the accompanying drawing.

The drawing reproduces essential parts also shown in FIG. 3 of the copending application, so as to indicate the principles of construction of the corresponding circuit arrangement. This circuit arrangement is constructed as a coupling multiple. The coupling point contacts are arranged in crossing fashion in rows and columns and are row-wise and column-wise multipled. Thus, the coupling point contacts 1k1 . . . 1k4 are arranged in a row of the coupling multiple, each such contact being with one terminal thereof connected with the corresponding row conductor. The other terminals of these coupling point contacts are individually connected with different column conductors P1, P2, etc. The contacts 1k1 . . . 10k1, lying along a column conductor, are in analogous manner connected, with one terminal thereof in common to the respective column conductor and with the other terminal thereof individually with various row conductors which are disposed in perpendicular crossing arrangement with the respective column conductor. The coupling point contacts of the remaining column conductors and row conductors are similarly disposed. A row conductor can be connected with a column conductor by closing a coupling point contact; closure of two coupling point contacts connected to one and the same column conductor effects an interconnection between two row conductors over the respective column conductor. To the row conductors are connected the call multiplex lines . . . SM3*a*, SM3*b* . . . SM5*a*, SM5*b* . . . of time multiplex systems such as F3, F5. To these time multiplex communication systems are connected groups of subscriber lines such as indicated at 3Tn, 4Tn, 5Tn, which are to be served by the circuit arrangement described in the copending application. In such circuit arrangement are moreover provided particular column conductors which are respectively in crossing relationship only with row conductors connected with call multiplex lines for outgoing calls or only with row conductors connected with call multiplex lines for incoming calls. To the particular column conductors of the first named type are connected the multiplex lines of time multiplex communication systems such as G1, G2 . . . which are provided with trunk lines such as indicated at 1Lna . . . 2Lna, leading to other exchanges, for outgoing calls, instead of being provided with subscriber lines, and to the particular column conductors of the second named kind are connected multiplex lines such as M1*a*, M2*a* . . . of time multiplex communication systems such as H1, H2 . . . which are, instead of with subscriber lines, provided with trunks 1Lnb, 2Lnb . . . for incoming calls from other exchanges or the like. Over the above named particular column conductors are extended calls between such a trunk line which is connected with another exchange and a subscriber of one of the time multiplex systems . . . F3 . . . F5 . . . which is done by impulse-wise closure of coupling point contacts such, for example, as the coupling point contact 1k3 or the coupling point contact 10k3, such coupling point contacts being connected with the respective column conductors and row conductors. The various circuit parts shown in the accompanying drawing are referenced similarly as in the copending application referred to before, and it is therefore believed to be unnecessary to go into details thereof, inasmuch as these parts are already described in detail in the copending application which may be consulted in connection therewith.

According to the invention, the coupling field is additionally provided with special row conductors which are indicated in the drawing by Mz1 . . . Mzz. These special row conductors are disposed in crossing relationship with particular column conductors to which the connected multiplex lines such as respectively indicated at M1*b*, M2*b* . . . M1*a*, M2*a* to which are respectively connected the time multiplex communication systems G1, G2 . . . and H1, H2, provided with trunk lines such as 1Lna 2Lna, . . . 1Lnb, 2Lnb . . . extending respectively to other exchanges. At the crossing points of the respective special row conductors and the particular column conductor, are disposed coupling point contacts g1kz1 . . . h1kz1 . . . g1kzz . . . h2kzz, one terminal of these coupling point contacts being connected with the corresponding row conductor Mz1 . . . Mzz and the other terminal thereof being connected with a particular column conductor to which is connected a call multiplex line such as M1*b*, M2*b* . . . ; M1*a*, M2*a* . . . of the respective time multiplex systems G1, G2 . . . ; H1, H2 . . . being respectively provided with trunk lines leading to other exchanges.

Calls between the time multiplex communication systems H1, H2 . . .with trunk lines incoming from other exchanges, and the time multiplex communication systems G1, G2 . . . with trunk lines outgoing to other exchanges or the like, are effected as follows:

For example, upon assuming that a connection is to be extended between a trunk line of the line group 2Lnb of the communication system H2 and a trunk line of the line group 2Lna of the communication system G2, a call switch of the corresponding trunk line will be periodically impulse-wise closed (closed in a particular time slot of a respective time sequence) in the system H2, as noted already in the copending application, thereby periodically connecting the respective trunk line with the multiplex line M2*a* of the time multiplex communication system H2. The control pulse which effects such closure of the call switch has a definite phase position which is different from the phase position of control pulses allotted to the other trunk lines of the communication system H2. Synchronously with the actuation of the call switch alloted to the trunk line referred to is also impulse-wise periodically closed a coupling point contact extending to a special row conductor, for example, the coupling point contact h2kzz connected with the special row conductor Mzz. The coupling point contact g2kzz is also closed with the same pulse phase, such latter contact establishing connection between the special row conductor Mzz and the particular column conductors to which is connected the multiplex line M2*b* of the time multiplex communication system G2 in which is located the desired trunk line in the group of trunk lines 2Lna. This results in a connection between the multiplex line M2*a* of the system H2 and the multiplex line M2*b* of the system G2. The desired telephone connection is now established—as already explained in the copending application—by the cycling, in the cyclic storer of the system G2, of the address of the desired line in the line group 2Lna, the control pulse thereby resulting for the call switch of the trunk line in the system G2 having the same position as the control pulse assigned to the call switch which is allocated to the first line in the system H2. Accordingly, the maintenance of the corresponding call requires in each of the respective time multiplex communication system only one cyclic storer.

A plurality of telephone connections may of course be present simultaneously between two of the particular time multiplex communication systems which are provided with trunk lines extending to other exchanges or the like, it being in such a case merely necessary that the respective control pulses are different as to the phase position thereof. Such telephone connections may even be conducted over the same coupling point contacts without entailing any mutual interference. Lines forming parts of other pairs of particular time multiplex communication systems may likewise be connected together at the same time, since other coupling point contacts are in such cases involved. Telephone connections may also be simultaneously present which are maintained with the aid of control pulses with the same phase position, provided, however, that they extend over different special row conductors Mz1 . . . Mzz.

As already explained in the copending application, the particular time multiplex communication systems which are provided with exchange lines instead of with subscriber lines, can be combined in pairs; for example, the communication systems such as indicated at G1 and H1 may be combined to form a common communication system.

There will now be explained the manner in which may be operatively actuated the coupling point contacts which are according to the invention additionally provided in the coupling field. These coupling point contacts can be actuated with the aid of means similar to those which are in the copending application utilized for actuating the call switches in the individual time multiplex communication systems. For example, there may be provided special cyclic storers in which are cycled, as addresses, code signals respectively allotted to the coupling point contacts, such code signals serving for the production of control pulses which effect the impulse-wise periodic actuation of the respective coupling point contacts. For example, such cyclic storers may be respectively allotted, one to each particular column conductor and the coupling point contacts associated therewith. Thus, devices indicated in the drawing by JG1, JG2 . . . JH1, JH2 . . . comprising respectively a cyclic storer with decoder and other, not illustrated parts, are respectively allocated to the coupling point contacts of the illustrated circuit arrangement. The cyclic storer with decoder, of the device JG1 has, for example, a number of outputs corresponding exactly to the number of additional coupling point contacts which are according to the invention connected with the multiplex line M1*b* of the time multiplex communication system G1. These coupling point contacts are over these outputs in given cases actuated. More than one contact connected to a particular column conductor need not be simultaneously actuated, since different telephone connections would otherwise be connected together; one cyclic storer is therefore sufficient for the actuation of coupling point contacts which are connected with a particular column conductor. In the event that there is a sufficiently small number of coupling point contacts which are to be respectively operatively controlled from the devices JG1, JG2 . . . or JH1, JH2 . . . and which are connected with particular column conductors connected with multiplex lines or bars extending to exchange trunk lines or the like, for outgoing calls, and to exchange trunk lines for incoming calls, the respective two devices can be combined to form a corresponding common device. Such a device can in given cases also be combined to form a common device respectively with one of the devices J1, J2, J3 . . . or J8, J9, J10 or with the corresponding device of a time multiplex communication system . . . F3 . . . F5 . . . . It is likewise possible to operatively control by cyclic storers the coupling point contacts in other combinations, for example, by cyclic storers equal in number to the number of connections which are to be simultaneously effected at a given pulse phase position, whereby each cyclic storer must be adapted to control each of the coupling point contacts.

Changes may be made within the scope and spirit of the appended claims which define what is believed to be new and desired to have protected by Letters Patent.

I claim:

1. A circuit arrangement constructed in the manner of a coupling multiple, over which telephone systems which are respectively provided with a call multiplex line for incoming calls and a call multiplex line for outgoing calls to which subscribers of the respective systems are connectible, comprising row conductors connected to the individual call multiplex lines for outgoing calls and to the individual call multiplex lines for incoming calls, and connectible by coupling point contacts to column conductors thereof, which conduct the traffic between the various time multiplex systems, by closure of two coupling point contacts in a particular time slot in a respective sequence, which establishes connection between respectively involved row conductors, first particular column conductors disposed to respectively cross only row conductors with call multiplex lines for outgoing calls and connected to the individual multiplex line of further time multiplex communication systems having trunks extending to other exchanges connected therewith, and second particular column conductors disposed to respectively cross only row conductors with call multiplex lines for incoming calls and connected to the individual multiplex lines of further time multiplex communication system having trunks coming from other exchanges connected therewith, means forming special row conductors in said coupling multiple which cross respectively only the first mentioned particular column conductors to which are connected multiplex lines of said further time multiplex communication systems having trunks extending to other exchanges connected therewith and the second particular column conductors to which are connected multiplex lines of said further time multiplex communication systems having trunks coming from other exchanges connected therewith, whereby the traffic between and with the further time multiplex communication systems, can be conducted over said special row conductors by closure of coupling point contacts cooperatively arranged with respect to corresponding particular column conductors in a particular time slot.

2. A circuit arrangement according to claim 1, wherein the coupling point contacts which are respectively connected with one and the same particular column conductor and with one of said row conductors, are operatively actuated with the aid of code signals which serve as addresses therefore and which are periodically cycled in a cyclic storer.

3. A circuit arrangement according to claim 2, wherein coupling point contacts which are connected with the same row conductor but extending to different column conductors, are simultaneously actuated only when they are involved in one and the same call.

4. A circuit arrangement according to claim 2, wherein a plurality of cyclic storers are combined to form at least one common cyclic storer.

5. A circuit arrangement according to claim 4, wherein cyclic storers are combined to form a common cyclic storer with a cyclic storer utilized in one of said telephone communication systems.

References Cited by the Examiner

UNITED STATES PATENTS

| | | | |
|---|---|---|---|
| 2,917,583 | 12/1959 | Burton et al. | 179—15 |
| 3,049,593 | 8/1962 | Touraton et al. | 179—15 |

DAVID G. REDINBAUGH, *Primary Examiner.*

T. G. KEOUGH, R. L. GRIFFIN, *Assistant Examiners.*